US010378569B2

(12) United States Patent
Jensen et al.

(10) Patent No.: US 10,378,569 B2
(45) Date of Patent: Aug. 13, 2019

(54) ADHESIVE BASED MOUNTING STRUCTURE (71) Applicant: Caterpillar Inc., Peoria, IL (US)

(72) Inventors: Jeff A. Jensen, Dunlap, IL (US); Joe J. Every, Peoria, IL (US); Aaron K. Amstutz, Peoria, IL (US); Steve D. Lundquist, Varna, IL (US)

(73) Assignee: Caterpillar Inc., Deerfield, IL (US)

( * ) Notice: Subject to any disclaimer, the term of this patent is extended or adjusted under 35 U.S.C. 154(b) by 45 days.

(21) Appl. No.: 15/793,235

(22) Filed: Oct. 25, 2017

(65) Prior Publication Data
US 2019/0120269 A1 Apr. 25, 2019

(51) Int. Cl.
F16B 47/00 (2006.01)
F16B 11/00 (2006.01)

(52) U.S. Cl.
CPC .......... F16B 11/006 (2013.01); F16B 47/003 (2013.01)

(58) Field of Classification Search
CPC ....... F16B 11/006; F16B 47/003; F16B 47/00
See application file for complete search history.

(56) References Cited

U.S. PATENT DOCUMENTS

| 2,557,434 | A |   | 6/1951 | Hoverder |
| 2,679,998 | A | * | 6/1954 | Keller ................... F16B 47/003 248/205.3 |
| 3,504,878 | A | * | 4/1970 | Dressler ............. A47G 25/0607 211/105.1 |
| 3,532,316 | A |   | 10/1970 | Mathes et al. |
| 3,964,531 | A |   | 6/1976 | Schenk |
| 4,076,774 | A | * | 2/1978 | Short ....................... B01J 13/16 264/4 |
| 4,488,335 | A |   | 12/1984 | Fox et al. |
| 4,822,224 | A |   | 4/1989 | Carl et al. |
| 4,842,912 | A |   | 6/1989 | Hutter, III |
| 5,065,489 | A |   | 11/1991 | Mullen et al. |
| 5,277,530 | A | * | 1/1994 | Sweeney, Sr. .......... B29C 65/54 411/258 |
| 5,593,120 | A |   | 1/1997 | Hamerski |
| 6,727,466 | B2 |   | 4/2004 | Hutter, III |
| 7,815,988 | B2 |   | 10/2010 | Stumpf et al. |
| 8,038,823 | B2 |   | 10/2011 | Hutter, III |
| 8,192,406 | B2 |   | 6/2012 | Wells et al. |
| 8,318,278 | B2 |   | 11/2012 | Amal et al. |
| 2002/0134489 | A1 |   | 9/2002 | Sweeny, Jr. et al. |

(Continued)

FOREIGN PATENT DOCUMENTS

DE 10142944 3/2003
DE 10143542 3/2003

(Continued)

Primary Examiner — Bradley Duckworth
(74) Attorney, Agent, or Firm — Harrity & Harrity LLP (57) ABSTRACT A mounting structure for adhesively bonding onto a surface includes a base, an outer face of the base and an inner face of the base. An adhesive injection port is provided on the outer face of the base for supplying an adhesive. A primary adhesive flow path is provided on the inner face of the base. The primary adhesive flow path is in fluid communication with the adhesive injection port and allows the adhesive to flow. Further, a plurality of secondary adhesive flow paths originating from the primary adhesive flow path allow the adhesive to distribute on the inner face.

20 Claims, 7 Drawing Sheets (56) References Cited

U.S. PATENT DOCUMENTS

| | | |
|---|---|---|
| 2005/0012002 A1 | 1/2005 | Ortwein |
| 2005/0129958 A1 | 6/2005 | Hansel |
| 2007/0134972 A1 | 6/2007 | Hoy |
| 2008/0251196 A1 | 10/2008 | Stumpf et al. |
| 2009/0022976 A1 | 1/2009 | Enserink et al. |
| 2011/0042002 A1 | 2/2011 | Blank et al. |
| 2011/0117370 A1 | 5/2011 | Ash et al. |
| 2012/0311825 A1 | 12/2012 | Schneider |
| 2013/0056598 A1 | 3/2013 | Ghiorghie |
| 2013/0341967 A1 | 12/2013 | Greve |
| 2014/0060724 A1 | 3/2014 | Amato et al. |
| 2015/0114544 A1 | 4/2015 | Amstutz |
| 2016/0121812 A1 | 5/2016 | Avalos Sartorio et al. |
| 2016/0273565 A1 | 9/2016 | Clemens et al. |

FOREIGN PATENT DOCUMENTS

| | | |
|---|---|---|
| EP | 0900944 | 3/1999 |
| JP | H0263726 | 3/1990 |
| WO | 9509548 | 4/1995 |

\* cited by examiner

ADHESIVE BASED MOUNTING STRUCTURE

TECHNICAL FIELD

The present disclosure relates generally to a mounting structure for adhesively bonding onto a surface and more specifically to a mounting structure having adhesive flow paths for distributed flow of adhesive for bonding onto a surface.

BACKGROUND

In many industrial applications, it may be advantageous to mount or attach a component such as an electric harness, a hydraulic harness, small hardware, a display, a side view mirror and the like onto a supporting structure by adhesively connecting a mounting structure. For example, it may be necessary to attach hardware to a base structure such as a roll over protection structure (ROPS) in a machine, or directly to an existing panel, such as a body panel. In a conventional system, the hardware is typically attached to the structure using a welding technique. However, welding generally must be performed during initial machine assembly and may not be a viable option for end of line installations or for retrofit improvements. In addition, welding or drilling a ROPS may have an adverse effect on the structural integrity of the ROPS.

Due to the above limitations, there is an increasing demand for adhesive based mounting structures. These mounting structures utilize an adhesive flow channel for an adhesive to follow a guided path and thus spread across the surface of the mounting structure for bonding of the mounting structure with the surface of the supporting structure. However, existing adhesive mounting structures have certain deficiencies such as reduced optimum bonding strength and excessive use of adhesive.

U.S. Patent Publication Number 2015/0114544 (the '544 publication) discloses an adhesive based fastening system for attaching a device to a machine or vehicle, such as on a door panel. The device is positioned on the surface of the car where the attachment is required and fasteners are used for fastening the device. Further, the fastener includes a sealing ring, a cup shaped body with an outer flange and a vent on the outer surface. The sealing ring is attached to the car surface. The cup shaped body includes a bore on its surface which is used for injecting the adhesive. A partition is provided between the bore and vent to enhance filling of the adhesive space. The mounting structure disclosed in the '544 publication, however, is open for improvements in various ways to enhance the operating characteristics and performance.

SUMMARY

In one aspect of the present disclosure, an adhesive based mounting structure is disclosed. The mounting structure includes a base having an outer face and an inner face, an adhesive injection port located on the outer face, a primary adhesive flow path provided on the inner face, and a plurality of secondary adhesive flow paths provided on the inner face. At least one of the inner face, the primary adhesive flow path, and the plurality of secondary adhesive flow paths have a textured surface.

In another aspect of the present disclosure, an adhesive based mounting structure is disclosed. The mounting structure includes a base having an outer face and an inner face, an adhesive injection port located on the outer face, a primary adhesive flow path provided on the inner face, and a plurality of secondary adhesive flow paths provided on the inner face. The mounting structure is made from a non-reinforced resin and has a flex modulus less than 4 GPA.

In yet another aspect of the present disclosure, an adhesive based mounting structure is disclosed. The mounting structure includes a base having an outer face and an inner face, an adhesive injection port located on the outer face, a primary adhesive flow path provided on the inner face, and a plurality of secondary adhesive flow paths provided on the inner face. An adhesive overflow port is provided on the outer face. The adhesive overflow port includes a thin film surface providing a seal between the inner face and the outer face.

Other features and aspects of this disclosure will be apparent from the following description and the accompanying drawings.

DETAILED DESCRIPTION

Figure 1:
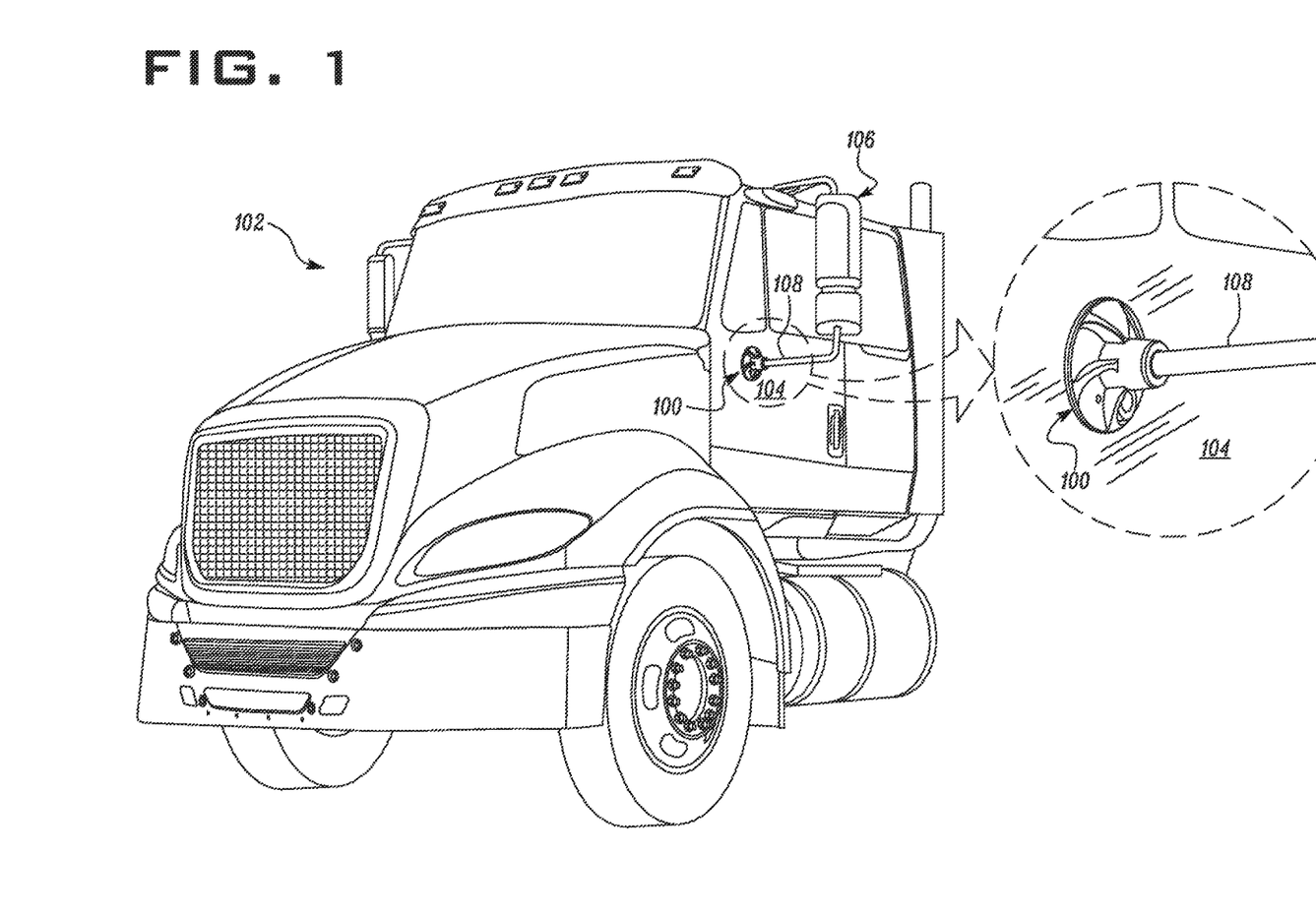
FIG. 1 illustrates a mounting structure attached to a surface, according to an embodiment of the present disclosure.

The present disclosure relates to a mounting structure for adhesively bonding to a surface. FIG. 1 illustrates an exemplary mounting structure 100 attached to a machine 102, according to an embodiment of the present disclosure. The machine 102 is embodied as a truck. However in various other embodiments, the machine 102 may be any other type of mobile or stationary machine having application in earthmoving, mining, construction, rail, automotive, aerospace, marine, or any of a number of other industries. In the illustrated embodiment, the mounting structure 100 is attached to a door surface 104 (hereinafter referred to as the surface 104) of the machine 102 and supports a component 106, such as a side view mirror. The surface 104 may be any surface and is contemplated to include, but not be limited to, an exterior or interior surface associated with the machine 102 or any sub-system of the machine 102.

The component 106 may be supported on the mounting structure 100 via attachment hardware 108 associated with the component 106. The attachment hardware 108 may be secured with the mounting structure 100 at one end and support the component 106 at another end. Alternatively, the component 106 may be directly secured to the mounting structure 100. In various other embodiments, the component 106 may be any component required to be attached onto the surface 104 with or without the attachment hardware 108 for example, but not limited to, electric or hydraulic harnesses, display mounts, fire extinguisher supports, etc.

Figure 2:
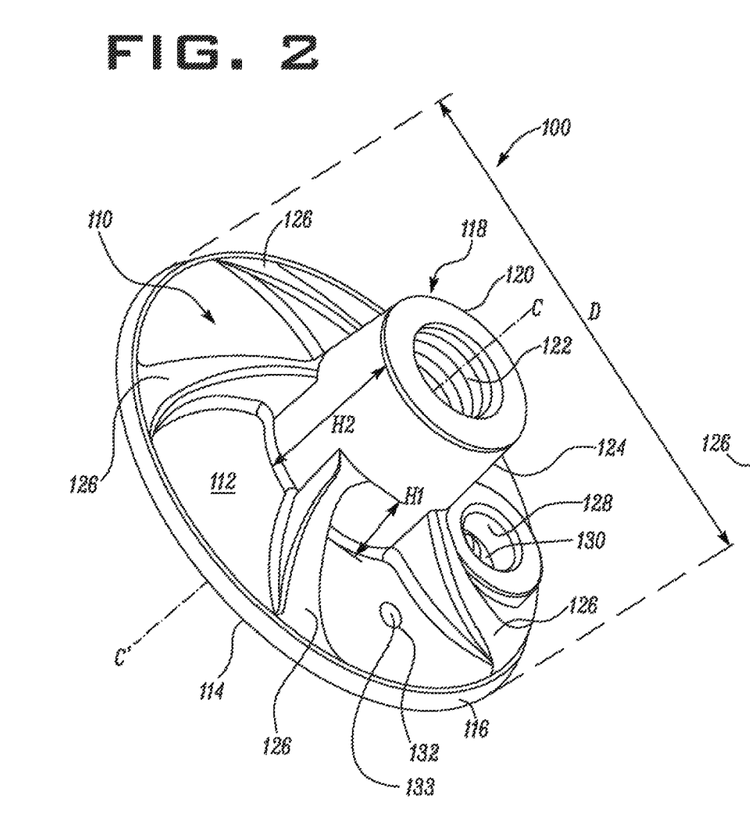
FIG. 2 illustrates a first perspective view of the mounting structure of FIG. 1.
Figure 3:
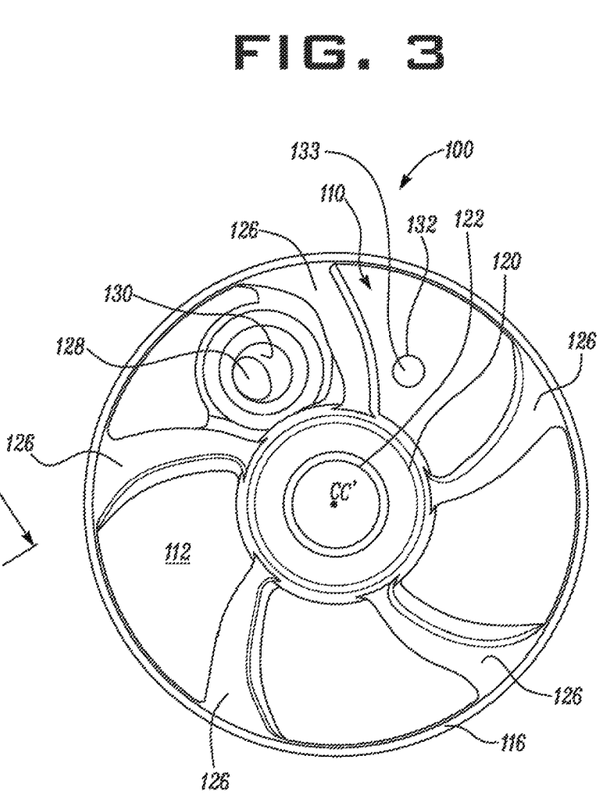
FIG. 3 illustrates a top view of the mounting structure of FIG. 2.

FIGS. 2 and 3 illustrate a first perspective view and a top view of the mounting structure 100 of FIG. 1, respectively. The mounting structure 100 includes a base 110 having an outer face 112 and an inner face 114. In an embodiment, the base 110 has a substantially circular disc-like shape bounded by an outer edge 116. The base 110 may have a diameter D, and a center axis CC' passing through the geometric center of the base 110. In an embodiment, the diameter D of the base 110 may be in a range of about 30 mm to 100 mm. In various other alternative embodiments, the base 110 may have other types of geometrical shapes, such as rectangular, square, oval or any other polygonal shape.

Figure 13:
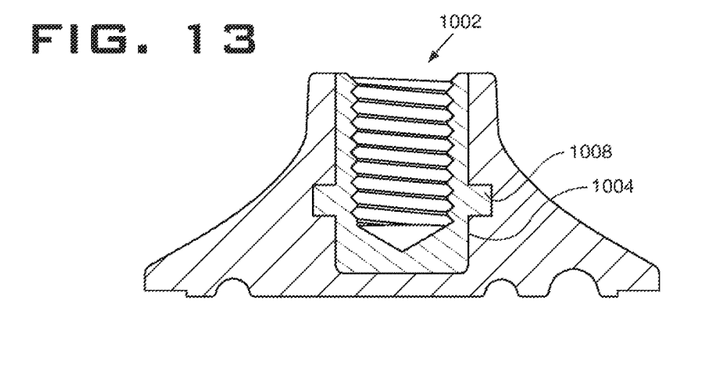
FIG. 13 illustrates another aspect of the threaded insert of FIG. 10.

The mounting structure 100 further includes an attachment portion 118 provided on the outer face 112 of the base 110. The attachment portion 118 is configured to secure the attachment hardware 108 or the component 106 to the mounting structure 100. According to an embodiment, the attachment portion 118 may include a mounting boss 120 extending along the center axis CC' from the outer face 112. The mounting boss 120 may have a substantially cylindrical shape with a threaded opening 122 at a distal end 124. The threaded opening 122 is configured to receive the attachment hardware 108, for example an externally threaded shaft associated with the component 106. The threads in the threaded opening 122 may be cut directly into the mounting boss 120. Alternatively, a threaded insert 1002 may be embedded into the mounting boss 120. The threaded insert 1002 may be made of steel, brass, aluminum, or some such other metal, and may have an external portion 1004 that is hex shaped or burled to prevent the threaded insert 1002 from rotating when torque is applied to a bolt being attached to the mounting boss 120. In an embodiment shown in FIG. 13, the threaded insert may have an external portion 1004 with protruding members 1008 to prevent rotation of the threaded insert 1002. The threaded insert 1002 may also have a closed end 1006 (i.e., a metal bottom) to stop the movement of a bolt into the mounting boss 120.

According to an embodiment, the mounting boss 120 and the base 110 may be formed as a single unitary body. As an alternative to a substantially cylindrical shape, the mounting boss 120 may be shaped as a rectangle, square, oval or any other polygonal shape. The mounting boss 120 may also be located asymmetrically on the mounting structure 100, for example if it would be advantageous for supporting a load applied to the mounting structure 100.

Figure 11:
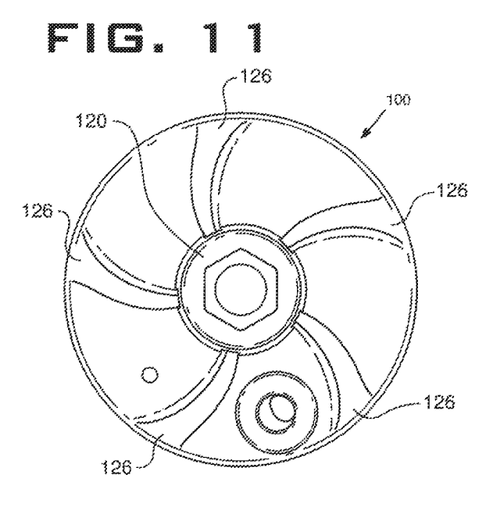
FIG. 11 illustrates a top view of a mounting structure depicting another aspect.

Further, pluralities of ribs 126 are disposed around the mounting boss 120. The ribs 126 extend radially outward from the mounting boss 120 toward the outer edge 116 of the base 110. Further, the ribs 126 may extend arcuately outward and downward toward the outer edge 116. The ribs 126 are configured to strengthen the mounting boss 120 during application of a torque applied to the mounting boss 120 during assembly of the attachment hardware 108 or component 106 to the mounting structure 100. The ribs 126 as shown in FIGS. 2 and 3 are illustrated as curving in a counterclockwise direction when the mounting structure 100 is viewed from the top. As an alternative, FIG. 11 shows the ribs 126 curving in a clockwise direction, thus providing additional strength when torque is applied to the mounting boss 120 in a clockwise direction, such as when tightening a bolt into the mounting boss 120.

In an embodiment, the ribs 126 may include an array of uniformly contoured, oriented, and spaced arcuate ribs 126 attached to the mounting boss 120 and the outer face 112. In an embodiment, the ribs 126 are attached to the mounting boss 120 at a height H1 from the outer face 112 which is about one half of an overall height H2 of the mounting boss 120. The difference in heights, H1 and H2, provide a clearance near the distal end 124 for receiving a coupling arrangement, such as a hose clamp connected to the mounting boss 120.

Figure 6:
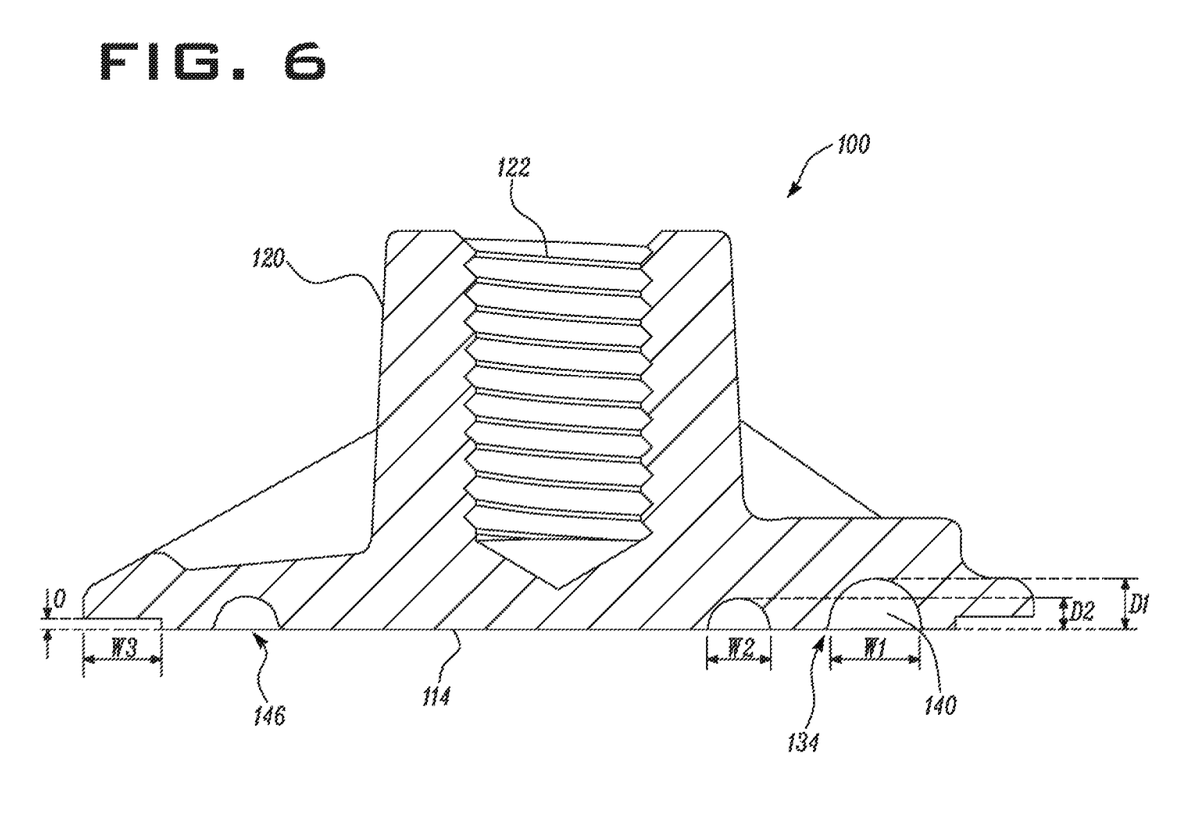
FIG. 6 illustrates a sectional view of the mounting member along a line XX' shown in FIG. 5
Figure 12:
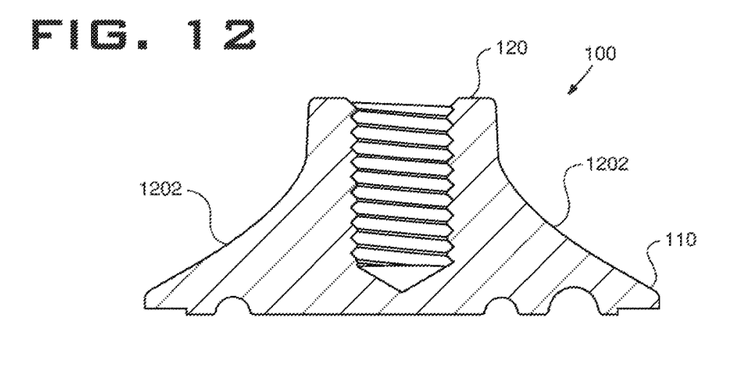
FIG. 12 illustrates a cross sectional view of a mounting structure having a flared portion.

FIG. 6 depicts the mounting boss 120 as a generally cylindrical structure, without significant change in diameter to the base 110. FIG. 12 shows an alternative in which the mounting boss 120 includes a flared portion 1202 near the base 110. The flared portion 1202 provides additional strength for the mounting boss 120. It is noted that the flared portion 1202 may assume a number of shapes, such as curved, straight, stepped, and the like, the basic idea being that the mounting boss 120 increases in diameter as it nears the base 110.

In various other embodiments, the attachment portion 118 may include other structures such as one or more flanges extending from the outer face 112, a stud, a ring, a peg, or a hook. The various structures embodied as the attachment portion 118 provided on the outer face 112 of the base 110 are configured to secure the attachment hardware 108 and/or the component 106 directly. Further, the attachment portion 118 may be pivotally or fixedly attached to the outer face 112 of the base 110 depending on the application or design characteristics of the component 106 required to be attached to the surface 104 via the mounting structure 100.

The mounting structure 100 further includes an adhesive injection port 128 formed on the base 110. The adhesive injection port 128 extends axially between the outer face 112 and the inner face 114. As illustrated in FIG. 3, the adhesive injection port 128 includes an angled portion 130 directed toward the inner face 114. An adhesive overflow port 132 is formed on the base 110 extending between the outer face 112 and the inner face 114. In an embodiment according to the present disclosure, the adhesive injection port 128 and the adhesive overflow port 132 may be located adjacent to each other and be positioned on either side of a rib 126.

Figure 4:
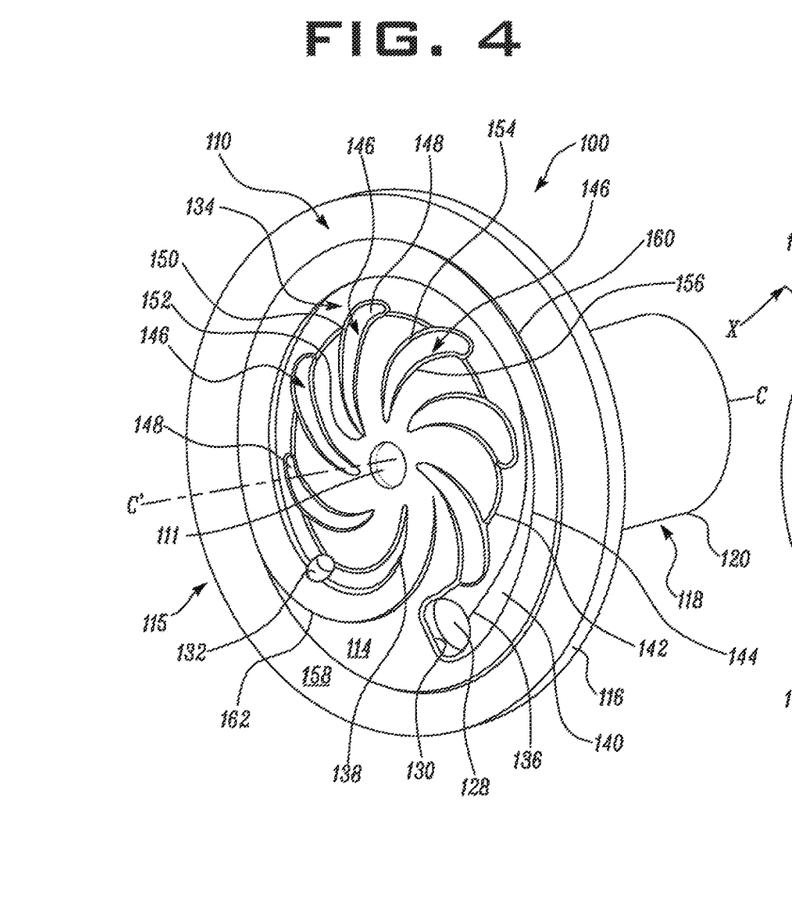
FIG. 4 illustrates a second perspective view of the mounting structure of FIG. 2.
Figure 5:
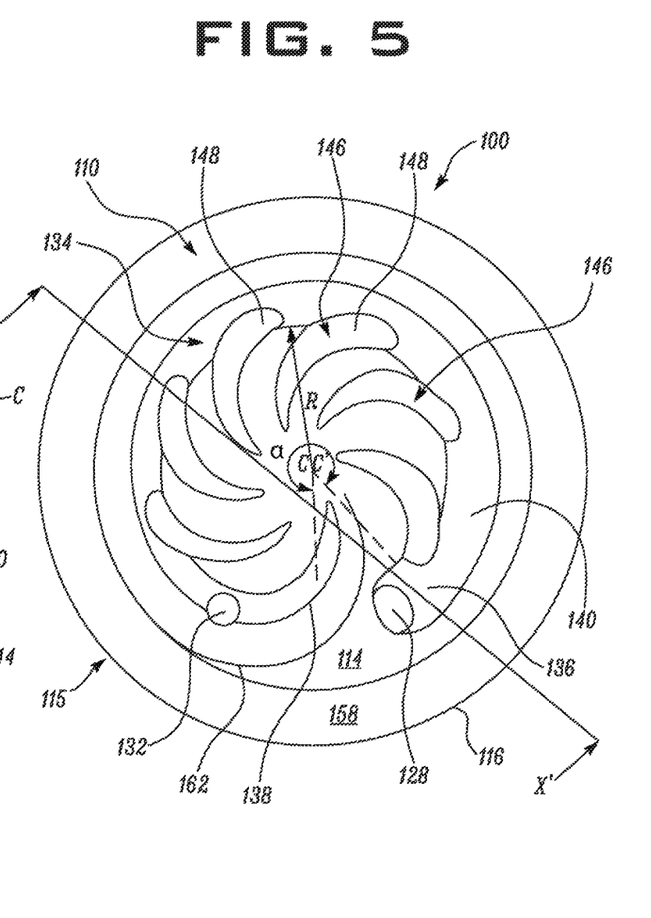
FIG. 5 illustrates a bottom view of the mounting structure of FIG. 2.

FIGS. 4 and 5 illustrate a second perspective view and a bottom view of the mounting structure 100, respectively, according to an embodiment of the present disclosure. The mounting structure 100 includes the substantially planar inner face 114 on which a primary adhesive flow path 134 is provided. The primary adhesive flow path 134 includes a first end 136 and a second end 138. The primary adhesive flow path 134 is in fluid communication with the adhesive injection port 128 at the first end 136. Further, the primary adhesive flow path 134 is in fluid communication with the adhesive overflow port 132 in proximity to the second end 138. The primary adhesive flow path 134 may include a first arcuate surface 140 formed as a groove extending between the first end 136 and the second end 138. Further, the first arcuate surface 140 defines a first edge 142 and a second edge 144 with the inner face 114, wherein the first and second edges 142, 144 may have substantially curved profiles extending between the first end 136 and the second end 138.

As illustrated in FIG. 5, the first arcuate surface 140 partially extends along a circular path, positioned between the center axis CC' and the outer edge 116 of the base 110, at a substantially constant radial distance R from the center axis CC' of the base 110. In the illustrated embodiment, the first arcuate surface 140 may further extend toward the center axis CC' of the base 110 near the second end 138. Moreover, the first end 136 and the second end 138 of the primary adhesive flow path 134 forms an angle α with the center axis CC' of the base 110. In an embodiment of the present disclosure, the angle α may be 180 degrees or more. In another embodiment, the angle α may be between 240 and 315 degrees to substantially surround the center axis CC' of the base 110.

FIG. 6 illustrates a sectional view of the mounting structure 100 along a line XX' shown in FIG. 5. As illustrated in FIGS. 5 and 6, the first arcuate surface 140 forming the primary adhesive flow path 134 has a width and a depth continuously decreasing from a first width W1, and a first depth D1 at the adhesive injection port 128 to a second width W2, and a second depth D2 at the adhesive overflow port 132. In an embodiment, the dimensions of the first width W1 and the first depth D1 of the primary adhesive flow path 134 are about twice as large as the dimensions of the second width W2 and the second depth D2 of the primary adhesive flow path 134.

Referring back to FIGS. 4 and 5, a plurality of secondary adhesive flow paths 146 originate from the primary adhesive flow path 134 at multiple locations between the first end 136 and the second end 138. Each secondary adhesive flow path 146 may include a second arcuate surface 148 formed as a groove on the inner face 114 of the base 110. The secondary arcuate surfaces 148 may curve radially inward from the first arcuate surface 140 toward the geometrical center of the base 110. The secondary arcuate surfaces 148 may also have widths and depths that continuously decrease from joining edges 150 with the first edge 142 of the first arcuate surface 140 toward a tip portion 152 of each of the second arcuate surfaces 148. In an embodiment, the joining edges 150 may have a curved profile. Further, the second arcuate surface 148 also defines a first edge 154 and a second edge 156 with the inner face 114, wherein the first and second edges 154, 156 have a substantially curved profile extending between the joining edges 150 and the tip portion 152.

The inner face 114 may be a smooth surface. However, the inner face 114 may alternatively be roughened or textured for improved bonding to the adhesive after injection. The roughened or textured surface may be machined in place or may be created by a mold during manufacture, such as by injection molding. The roughened or textured surface may or may not conform to a pattern and, if a pattern exists, the choice of pattern may be any desired texture. The roughened or textured surface may cover the entire inner face 114, or may be selectively applied to desired portions of the inner face 114 for improved bonding to the adhesive. The roughened or textured surface may also be applied to any of the primary and secondary adhesive flow paths 218, 220.

According to an embodiment of the present disclosure, the mounting structure 100 may include a perimetrical recessed surface 158 provided on the inner face 114. The perimetrical recessed surface 158 may be offset from a plane of the inner face 114 by a distance O and have a width W3 (see FIG. 6). The distance O is measured along a perimetrical ridge 160. In an embodiment, the distance O may be in a range of about 0.4 mm to 1.0 mm and the width W3 of the perimetrical recessed surface 158 may be in a range of about 4 mm to 10 mm. The dimensions of the distance O and the width W3 may be a function of one or more parameters including, but not limited to, the size of the mounting structure 100, the anticipated load to be supported, the properties of the substrate to be adhered to, the desired amount of adhesive to be injected, and the viscosity of the adhesive. Further, the perimetrical ridge 160 entirely surrounds the primary adhesive flow path 134 and may include an upright wall having an inset radius. The perimetrical ridge 160 may further extend toward the geometrical center of the inner face 114 adjacent to the angled portion 130 and form an auxiliary ridge 162 between the adhesive injection port 128 and the adhesive overflow port 132. The height of the perimetrical ridge 160 may be determined to control the thickness of the adhesive film applied to the mounting structure 100.

Figure 7:
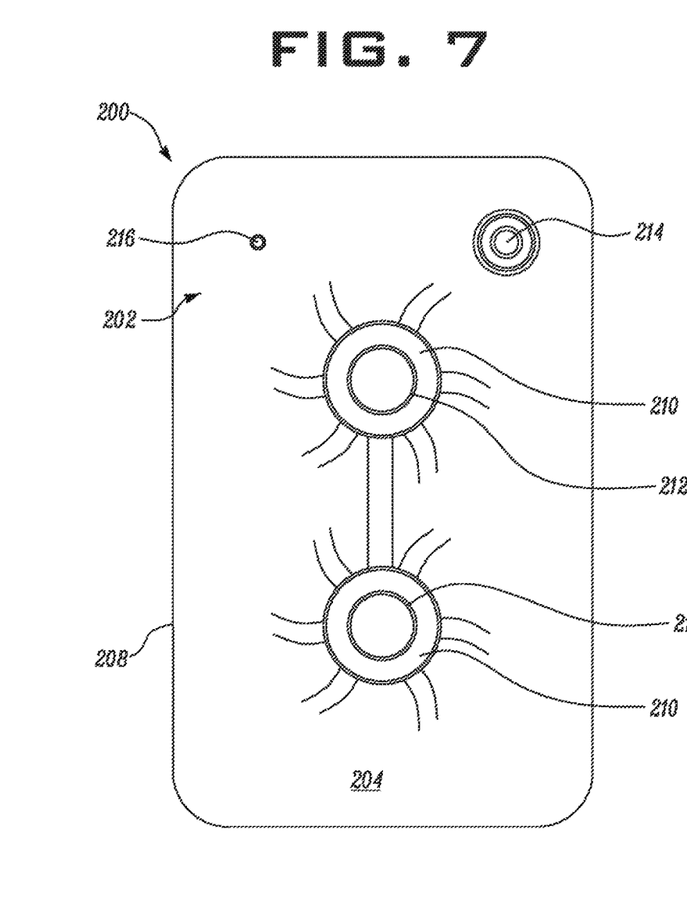
FIG. 7 illustrates a top view of the mounting structure, according to another embodiment of the present disclosure.
Figure 8:
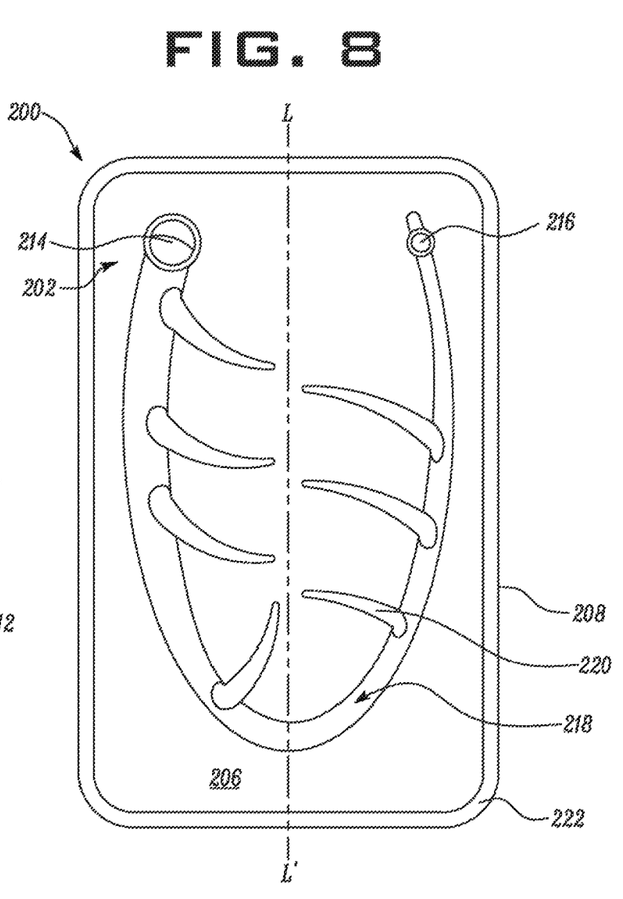
FIG. 8 illustrates a bottom view of the mounting structure of FIG. 7.

FIGS. 7 and 8 illustrate a top view and a rear view of a mounting structure 200, according to another embodiment of the present disclosure. The mounting structure 200 includes a base 202 with an outer face 204 and an inner face 206. In an embodiment, the base 202 has a substantially rectangular shape bounded by an outer edge 208. Further, the outer face 204 includes two mounting bosses 210. Each of the mounting bosses 210 extends from the outer face 204 of the base 202 and has a threaded opening 212. According to an embodiment of the present disclosure, the mounting structure 200 may be used to secure heavier components such as fire extinguishers or displays.

The mounting structure 200 may include an adhesive injection port 214 and an adhesive overflow port 216. As illustrated in FIG. 8, a primary adhesive flow path 218 is provided on the inner face 206 which is in fluid communication with the adhesive injection port 214 and the adhesive overflow port 216. Further, a plurality of secondary adhesive flow paths 220 originate from the primary adhesive flow path 218 and are oriented toward a center line LL' of the mounting structure 200. The adhesive flow paths 218, 220 may have an arcuate profile substantially similar to the adhesive flow paths 134, 146 shown in the FIGS. 4 and 5 embodiment. Moreover, a perimetrical recessed surface 222 entirely surrounds the adhesive flow path 218, 220 provided on the inner face 206. The perimetrical recessed surface 222 may be offset from a plane of the inner face 206.

It will be apparent to a person having ordinary skill in the art that the mounting structures 100 and 200 (hereinafter referred to collectively as mounting structures 100) may be manufactured by known techniques such as die-casting, 3D printing (additive manufacturing), or injection molding using metallic alloys or plastic composites. In an embodiment, the mounting structures 100 may be manufactured from commercially available plastic composites such as, but not limited to glass reinforced polymers, aluminum alloys, or magnesium alloys. The use of such plastic composites results in mounting structures 100 with a high level of stiffness. Alternatively, it may not be desired to create mounting structures 100 with high stiffness levels, but rather it may be advantageous to create mounting structures 100 with low stiffness and increased toughness. Such mounting structures 100 may have a desired flex modulus that is less than 4 GPA (gigapascals). This may be accomplished by making mounting structures 100 with non-reinforced resin (i.e., such as non-glass filled materials).

The mounting structures 100 may also be made with semi-transparent or transparent resin, thus providing visibility of the adhesive being injected to observe that the adhesive is thoroughly filling the inner face 114. The mounting structures 100 (and the adhesive) may be custom colored as desired. For example, the mounting structures 100 may be transparent or may be a semi-transparent desired color, and the adhesive may be a darker or contrasting color for ease of viewing the flow of adhesive throughout the inner face 114.

The resin used to make mounting structures 100 may be limited to unlubricated resins to avoid contamination of the adhered-to substrate, and the adhesive may have properties to protect any paint on the substrate, such as limiting methyl methacrylate in the adhesive to no more than 30%.

A common manufacturing method for items such as the mounting structures 100 is injection molding. However, those skilled in the art realize that injection molding may create issues to overcome. For example, the material to be injected must be injected through a gate, and the material then spreads throughout the mold before hardening. A gate vestige 111 results from the end of injection of the material through the gate. The gate vestige 111 must not protrude beyond the planar surface of the inner face 114 or uniform adhesion of the inner face 114 to a substrate may be adversely affected. An option is to trim the gate vestige 111 to a recessed position with respect to the planar surface of the inner face 114, thus providing additional surface area for adhesive to flow and bond. The location of the gate on the mold is also important to minimize the creation of weld lines (i.e., knit lines) in locations which may compromise the strength of the mounting structure 100.

INDUSTRIAL APPLICABILITY

Figure 9A:
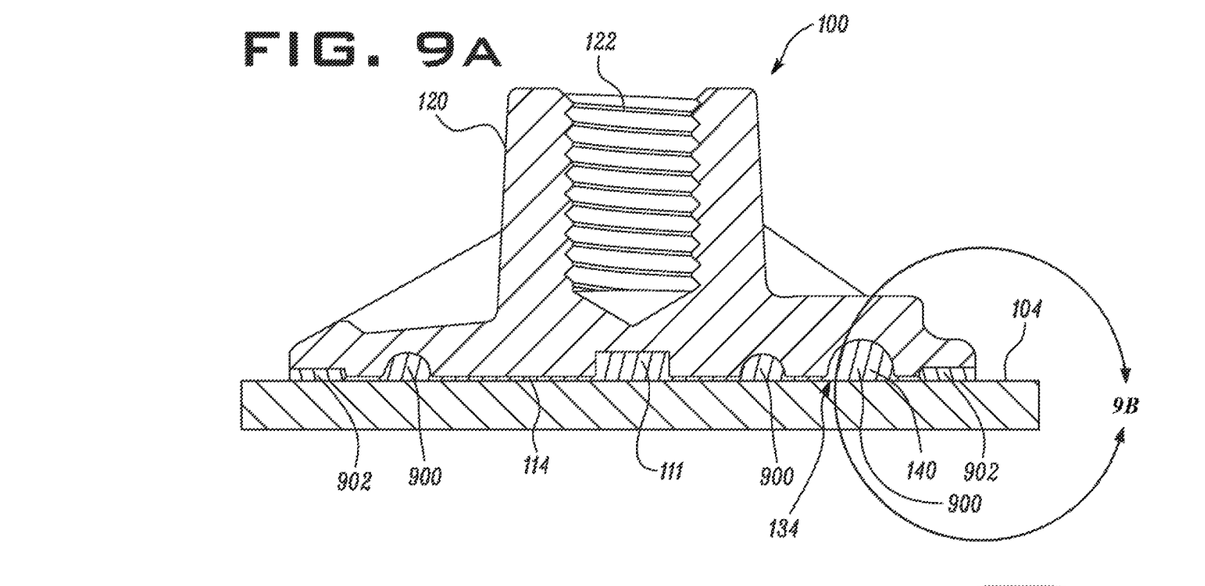
FIG. 9A illustrates a cross sectional view of the mounting structure of FIG. 2 adhesively bounded onto the surface.

As an example of application of mounting structures 100 of the present disclosure, FIG. 9A illustrates a cross sectional view of the mounting structure 100 of FIG. 2 adhesively bonded to a surface 104. To adhesively bond the mounting structure 100 to the surface 104, the mounting structure 100 is first placed onto the surface 104 with the inner face 114 of the mounting structure 100 abutting the surface 104. A double-sided tape 902 is provided along the perimetrical recessed surface 158 of the mounting structure 100, and a liner of the double sided tape 902 is removed to affix the mounting structure 100 at a desired location on the surface 104. The double-sided tape 902 also functions as a seal for conformal bonding to the surface 104. The perimetrical recessed surface 158 may function as a guide for accurate positioning of the double-sided tape 902. Subsequently, an adhesive 900 is injected through the adhesive injection port 128 provided on the outer face 112 of the mounting structure 100 using an adhesive gun (not shown). As the adhesive injection port 128 is in fluid communication with the primary adhesive flow path 134 provided on the inner face 114, this allows the adhesive 900 to flow through the primary adhesive flow path 134. The supply of the adhesive 900 is continued until the adhesive 900 extrudes through the adhesive overflow port 132.

Figure 9B:
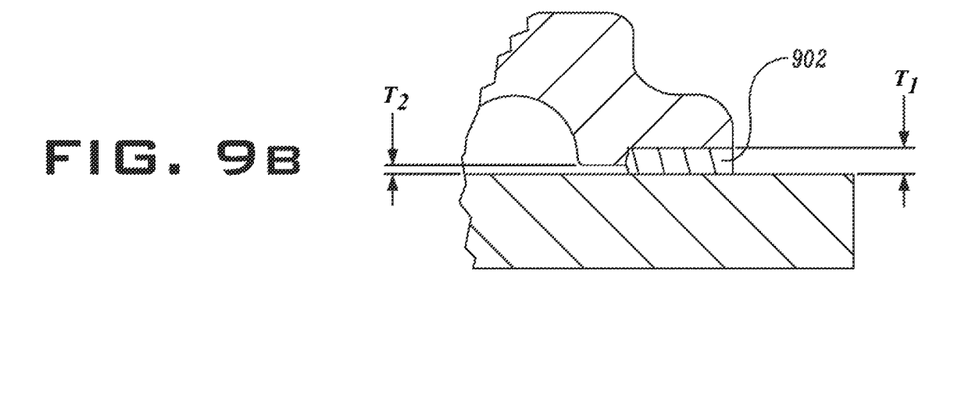
FIG. 9B illustrates an enlarged view of a portion of FIG. 9A.
Figure 10:
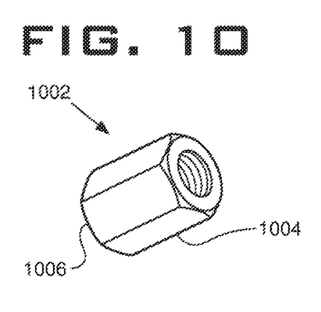
FIG. 10 illustrates an exemplary threaded insert.

An enlarged portion of FIG. 9A is shown in FIG. 9B to illustrate an aspect of the present disclosure in which the double-sided tape 902 serves to establish a nominal gap T2 for the thickness of adhesive 900. The thickness of the double-sided tape 902, denoted as T1, is preferably less than nominal gap T2.

The adhesive overflow port 132 may initially be covered with a thin film surface 133 which blocks the adhesive overflow port 132 and improves the flow of adhesive 900 throughout the inner face 114. As the adhesive 900 fills the inner face, the pressure from the adhesive 900 and from trapped air forces the thin film surface 133 to open, thus causing the adhesive overflow port 132 to function as a vent. Thorough application of the adhesive 900 is made evident by adhesive 900 flowing through the adhesive overflow port 132. The thin film surface 133 may be a thin layer of material from the original mounting structure 100, may be an adhesive tape applied over the adhesive overflow port 132, or may be an elastomer plug or stopper, such as a pressure relief plug.

The adhesive 900 is distributed throughout the inner face 114 along the secondary adhesive flow paths 146. The curved profile of the joining edge 150 provides a smooth flow of the adhesive 900 in the secondary adhesive flow paths 146. Further, the first and second edges 142, 144, 154, 156 of the first and second arcuate surfaces 140, 148 may allow a smooth flow of the adhesive 900 on the inner face 114. An undesired distribution of the adhesive 900 on the inner face 114 toward the outer edge 116 is limited by the double-sided tape 902, which also functions as a seal. Moreover, while injecting the adhesive 900 through the adhesive injection port 128, the adhesive 900 is directed toward the primary adhesive flow path 134 by the angled portion 130 provided in the adhesive injection port 128. Finally, the adhesive 900 is allowed to cure and form a bond between the inner face 114 and the surface 104.

As opposed to conventional methods of welding or using bolts to attach a mounting structure onto a surface, adhesively bonding the mounting structures 100 to the surface 104 provides more manufacturing flexibility and can reduce manufacturing time and cost. During an exemplary manufacturing cycle a component may be attached to the mounting structure 100 after the mounting structure has been painted and manufacturing and assembly have been completed, and components can be installed as retrofit installations in accordance with customer preferences.

According to an aspect of the present disclosure, the first and the second arcuate surfaces 140, 148 of the adhesive flow paths 134, 146 provide an improved control over a quantity and a flow rate of the adhesive 900. Further, the double-sided tape 902 provided along the perimetrical recessed surface 158 limits an outward overflow of the adhesive 900 beyond the mounting structure 100. Furthermore, according to the present disclosure, the adhesive bonding of the mounting structures 100 along the adhesive flow paths 134, 146 provides an improved distribution of adhesive to strengthen the attachment.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:
1. An adhesive based mounting structure comprising:
a base;
an outer face of the base;
an inner face of the base;
an adhesive injection port provided on the outer face;
a primary adhesive flow path provided on the inner face, the primary adhesive flow path in fluid communication with the adhesive injection port; and
an adhesive overflow port, wherein the adhesive overflow port includes a thin film surface providing a seal between the inner face and the outer face, and wherein at least one of the inner face or the primary adhesive flow path has a textured surface.

2. An adhesive based mounting structure as set forth in claim 1, further comprising a mounting boss for attaching a component, wherein the mounting boss includes a threaded metal insert embedded therein.

3. An adhesive based mounting structure as set forth in claim 2, wherein the threaded metal insert includes a closed end at a bottom portion of the threaded metal insert.

4. An adhesive based mounting structure as set forth in claim 2, wherein the base includes a plurality of ribs extending arcuately outward from the mounting boss to an outer edge of the base.

5. An adhesive based mounting structure as set forth in claim 4, wherein the plurality of ribs curve in a clockwise direction from the mounting boss to the outer edge of the base.

6. An adhesive based mounting structure as set forth in claim 4, wherein the plurality of ribs curve in a counter-clockwise direction from the mounting boss to the outer edge of the base.

7. An adhesive based mounting structure as set forth in claim 2, wherein the mounting boss increases in diameter near the base.

8. An adhesive based mounting structure comprising:
a base;
an outer face of the base;
an inner face of the base;
an adhesive injection port provided on the outer face;
a primary adhesive flow path provided on the inner face, the primary adhesive flow path in fluid communication with the adhesive injection port; and
an adhesive overflow port,
wherein the adhesive overflow port includes a thin film surface providing a seal between the inner face and the outer face, and
wherein the adhesive based mounting structure is made from a non-reinforced resin and has a flex modulus less than 4 GPA.

9. An adhesive based mounting structure as set forth in claim 8, wherein the adhesive based mounting structure is made from one of a transparent or a semi-transparent resin.

10. An adhesive based mounting structure as set forth in claim 8, wherein the adhesive based mounting structure is made from an unlubricated resin.

11. An adhesive based mounting structure as set forth in claim 8, wherein the inner face includes a perimetrical recessed surface along an outer edge of the base, the perimetrical recessed surface receiving a double-sided tape for temporary engagement of the adhesive based mounting structure.

12. An adhesive based mounting structure as set forth in claim 11, wherein the double-sided tape restrains a flow of injected adhesive around the outer edge.

13. An adhesive based mounting structure as set forth in claim 12, wherein a thickness of the double-sided tape determines a depth of the adhesive being injected.

14. An adhesive based mounting structure as set forth in claim 11, further comprising:
a plurality of secondary adhesive flow paths provided on the inner face, wherein the plurality of secondary adhesive flow paths originate from the primary adhesive flow path, wherein the perimetrical recessed surface is bounded along the inner face by a perimetrical ridge extending from a plane of the inner face, and wherein the perimetrical ridge surrounds the primary adhesive flow path and the plurality of secondary adhesive flow paths.

15. An adhesive based mounting structure comprising:
a base;
an outer face of the base;
an inner face of the base;
an adhesive injection port provided on the outer face;
a primary adhesive flow path provided on the inner face, the primary adhesive flow path in fluid communication with the adhesive injection port;
a plurality of secondary adhesive flow paths provided on the inner face, the plurality of secondary adhesive flow paths originating from the primary adhesive flow path; and
an adhesive overflow port provided on the outer face, wherein the adhesive overflow port includes a thin film surface providing a seal between the inner face and the outer face.

16. An adhesive based mounting structure as set forth in claim 15, wherein the thin film surface is a thin layer of material integral with the base.

17. An adhesive based mounting structure as set forth in claim 15, wherein the thin film surface is an adhesive tape applied over the adhesive overflow port.

18. An adhesive based mounting structure as set forth in claim 15, wherein the thin film surface is an elastomer plug.

19. An adhesive based mounting structure as set forth in claim 15, wherein the primary adhesive flow path includes a first arcuate surface having a width and a depth continuously decreasing from a first width and a first depth at the adhesive injection port to a second width and a second depth at the adhesive overflow port.

20. An adhesive based mounting structure as set forth in claim 19, wherein a secondary adhesive flow path, of the plurality of secondary adhesive flow paths, includes a second arcuate surface extending radially inward from the first arcuate surface toward a geometrical center of the base.

* * * * *